Patented Aug. 14, 1951

2,564,606

UNITED STATES PATENT OFFICE 2,564,606

INSECTICIDAL COMPOSITIONS

Joseph Henry Percy, Woodmere, N. Y., and Herbert Frank Neumann, South Orange, N. J., assignors to Colgate-Palmolive-Peet Company, Jersey City, N. J., a corporation of Delaware No Drawing. Application May 4, 1946,
Serial No. 667,486

6 Claims. (Cl. 167—42)

The present invention relates to insecticidal compositions which are particularly adapted for the protection of fruit trees and other food crops.

Organic insecticides such as dichlorodiphenyltrichloroethane (DDT), being effective in very small amounts, are usually applied to the thing to be protected against the ravages of insects as a dust or spray comprising a few per cent of insecticide in an inert carrier. It has been proposed to make a coarse powder or dust by dissolving the insecticide in a waxy solid such as stearic acid, glycerylmonostearate, cetyl alcohol, or the like, and pulverizing the solid solution. While the waxy solid has been said to protect the insecticide against rain, the coarse powder cannot be used satisfactorily on plants. Sprays comprising the insecticide in solution or suspension in liquids such as alcohol, petroleum cuts, water, etc., have also been proposed and used some extent on plants with and without binders. If no binder were present, the insecticide was quite rapidly washed off the plants which were exposed to the weather. If a binder were used which effectively prevented rain from washing off the insecticide, difficulty was experienced in removing the binder and insecticide from the harvested fruit or other food crop.

We have now discovered that a solution of an organic insecticide in a fatty acid monoester of a polyhydric compound, e. g., propylene glycol monoesters of coconut oil fatty acids, provides an insecticidal composition which can be readily dispersed in water, particularly in the presence of a small amount of emulsifying agent, to form a dilute spray composition admirably adapted for spraying fruit trees and other food crops since it adheres well to the surface of the plants, is not washed off to any substantial extent by rainwater, and yet is easily washed off the harvested fruit or other crop by aqueous solutions of emulsifying agents.

The present invention is applicable to all organic insecticides including rotenone, nicotine, pyrethrum, derris, beta-naphthol, thiocyanates, p - dichlorobenzene, dichlorodiphenyltrichloroethane (DDT), etc.

In the preferred form of the invention the monoester used as the carrier for the insecticide is liquid at the temperatures to which the composition will be exposed in use. Propylene glycol monoesters of coconut oil fatty acids made by reacting coconut oil fatty acids with an excess of propylene glycol at elevated temperature, for example, have very satisfactory properties for this use. It can dissolve up to about 17% by weight of dichlorodiphenyltrichloroethane (DDT) at 24° C.; it melts at about 3° C.; it is practically insoluble in water; it forms a dispersion in water very readily, particularly in the presence of an emulsifying agent; it spreads easily on and adheres tightly to fruit, leaves and other plant surfaces; and it can be removed easily by washing with an aqueous solution of an emulsifying agent. Other liquid monoesters of fatty acids and polyhydric alcohols have similar properties and advantages, including propylene glycol monolaurate, ethylene glycol monocaprate, glyceryl monocaproate, mixtures of glycol and glyceryl monoesters of palm kernel oil fatty acids such as are obtained by reacting palm kernel oil with an excess of glycol at elevated temperature in the presence of liquid water and/or an alkaline catalyst, etc.

A convenient way of preparing an insecticidal composition for market in accordance with the present invention is to dissolve the insecticide in the monoester and to incorporate therein a small percentage, preferably about 0.5% to 2.0%, of an emulsifying agent. The insecticide and emulsifying agent, within the amounts specified herein, dissolve in the monoester to give a clear solution. The use of an amount of insecticide greater than will go into solution in the monoester is wasteful. If more emulsifying agent is used than will dissolve in the monoester, the adhesion of the composition to plant surfaces during rain storms is decreased. The solution comprising the insecticide and emulsifying agent can either be put directly into bottles, cans, or the like for sale or it can be dispersed in water to form a concentrated oil in water emulsion which can be similarly packaged. The consumer prepares the spray liquid by pouring a small quantity of the mixture into water and stirring. The monoester with the insecticide in solution readily disperses throughout the water in minute globules, giving an emulsion of the product in water which is relatively stable and readily sprayed.

Monoesters which are solid at the temperatures encountered in the use of the material can also be employed. Among these are glyceryl monoesters of coconut oil, palm kernel oil, palm oil, etc., ethylene glycol monostearate, diethylene glycol monostearate, propylene glycol monostearate, etc. Insecticidal compositions of such materials can be prepared by melting the monoester, dissolving the organic insectide therein and emulsifying the mixture in water at a temperature above the melting point of the ester with the aid of an emulsifying agent to form a concentrated product. As soon as the ester and insecticide have been thoroughly dispersed in the water the temperature may be allowed to fall. As it passes through the melting point of the monoester, the droplets of the dispersed phase will solidify as discrete particles that remain suspended in the liquid. This suspension can be put in bottles, cans, etc., and used in the same way as the liquid type. The solid particles themselves do not cling as tenaciously to the surfaces of fruits, leaves, etc., as droplets of liquid monoesters but the emulsifying agent, in the proportions used, serves as quite an effective binder, even during rain storms.

The fatty acid monoesters of polyhydric organic compounds contemplated by the present invention include the polyhydric alcohol esters of fatty acids having from about six to about twenty-four carbon atoms per molecule. Among the polyhydric alcohols which can be used are the diols, such as ethylene glycol, propylene glycol, trimethylene glycol, butane diols, etc.; glycerol, butane trihydroxy alcohols, etc.; erythritol, mannitol, sorbitol, etc. This class of polyhydroxy compounds may be defined as aliphatic polyhydric alcohols having from two to six carbon atoms per molecule. Preferred alcohols are the di- and trihydroxy alcohols having from two to four carbon atoms per molecule including propylene glycol, ethylene glycol, diethylene glycol, and glycerol.

The fatty acids which are esterified with the polyhydroxy organic compounds are preferably the fatty acids obtained from naturally occurring fats, oils, waxes, etc., including coconut oil, palm kernel oil, palm oil, tallow, fish oils, spermaceti, carnauba wax, etc. Synthetic fatty acids, such as those obtained by the oxidation of petroleum oils, however, may also be used.

The monoesters obtainable commercially are not pure compounds but contain minor amounts of higher esters, free fatty acids, free alcohol, etc. A commercially available liquid monoester product which is very satisfactory for the present invention comprises approximately:

| | Percent |
|---|---|
| Propylene glycol monoesters of coconut fatty acids | 77 |
| Propylene glycol diesters | 17 |
| Free fatty acids | 2½ |
| Propylene glycol | 2 |
| Water | 1 |

The monoesters of fatty acids with polyhydric alcohols are capable of dissolving organic insecticides in very substantial proportions as illustrated by the solubility of DDT in propylene glycol monococate. The percentage of organic insecticide dissolved in the monoester for use in the present invention may vary from a fraction of one per cent up to the maximum amount that can be taken into solution, depending upon the concentration of the insecticide it is desired to have present on the surfaces of the plants being treated. Ordinarily about 5 to 15% of insecticide is a satisfactory proportion. The amount of this insecticidal composition which is dispersed in a given quantity of water in preparing the spray mixture can also be varied widely, thus giving an additional control over the concentration of the active ingredient that is applied to the plant surfaces.

The emulsifying agent is advantageously used in preparing a spray composition to give easier dispersion of the monoester in the water. While it can be added at the time of preparation of the spray mixture, it is preferred to add it to the monoester as already described. The insecticidal composition should be so compounded that when the proper amount is added to water to form a spray mixture, the emulsifying agent will be present within the range of 0.001 to 0.1% based on the water. Even higher percentages of emulsifying agent may be used if desired, but amounts larger than about 0.1% present no additional advantages and may lessen the adhesion of the insecticidal composition on the plant surfaces during rain storms. Within the preferred range of emulsifying agent, the spray, once it has dried, is not easily removed by rain. The emulsifying agents that may be used for this purpose are water-soluble cationic, anionic and nonionic materials which have dispersing and/or emulsifying properties, including amines, soap, synthetic detergents such as the organic sulphates and sulphonates, polyether alcohol condensates, etc.

The following examples are given for the purpose of illustrating the invention:

*Example I*

A suitable liquid insecticidal composition comprises:

| | Percent |
|---|---|
| DDT | 10 |
| Diethylene glycol monostearate | 5 |
| Propylene glycol monococate | 84 |
| Ammonium salt of coconut oil monoglyceride monosulphate | 1 |

One part by weight of this liquid dispersed in 50 to 100 parts of water makes a satisfactory spray for most agricultural purposes.

*Example II*

1 part of DDT is dissolved in 4 parts of glyceryl monostearate at about 60 C. The mixture is emulsified with about 5 parts of water containing 0.5% soap at about the same temperature. After thorough agitation the mixture is bottled. The suspension that forms on cooling is quite stable and disperses readily when mixed with additional water. One part of the suspension in 100 parts of water gives a satisfactory agricultural spray composition.

The advantages of applying the insecticide to a plant surface in a liquid polyhydric alcohol monoester are that the monoester serves to bind the insecticide to the fruit or other plant surface and to resist the tendency of rain and weather to wash off the insecticide which remains dissolved in the ester. The insecticide, being in solution in the monoester, is in a more effective form. A major advantage is that when it is desired to remove the insecticide, as in the case of fruit after it has been picked, this is readily accomplished by washing the fruit with an aqueous solution of soap or other emulsifying agent higher in concentration than that used in spraying, e. g., by agitating the fruit in the solution, spraying the fruit therewith, etc. The polyhydric alcohol monoester is very readily emulsified and removed under these conditions, and the insecticide, being in solution in the ester, is effectively removed at the same time.

Although the present invention has been described in connection with certain illustrative embodiments of the invention, modifications and variations within the scope of the appended claims is contemplated.

We claim:

1. An insecticidal composition adapted for dispersion in water to form a spray for plants consisting essentially of an organic insecticide, an emulsifying agent and a liquid fatty acid monoester of a polyhydric compound, said insecticide and emulsifying agent both being in solution in said monoester.

2. An insecticidal composition adapted for dispersion in water to form a spray for plants consisting essentially of an organic insecticide and an emulsifying agent both dissolved in a fatty acid monoester of an aliphatic polyhydric alcohol having from two to six carbon atoms per molecule.

3. An insecticidal composition as set forth in claim 2 in which a glycol monoester is used.

4. An insecticidal composition adapted for dispersion in water to form a spray for plants consisting essentially of dichlorodiphenyltrichloroethane and an emulsifying agent both dissolved in propylene glycol monoesters of coconut oil fatty acids.

5. An insecticidal composition adapted for dispersion in water to form a spray for plants consisting essentially of dichlorodiphenyltrichloroethane and an emulsifying agent both dissolved in a liquid glycol monoester of fatty acids having from six to twenty-four carbon atoms per molecule.

6. An insecticidal emulsion concentrate adapted for dispersion in water to form a spray for plants which comprises a fatty phase consisting essentially of an organic insecticide dissolved in a normally liquid polyhydric alcohol monoester of higher fatty acids, an aqueous phase and an emulsifying agent, said emulsifying agent not exceeding about 2% by weight of said fatty phase and being soluble therein.

JOSEPH HENRY PERCY.
HERBERT FRANK NEUMANN.

REFERENCES CITED

The following references are of record in the file of this patent:

UNITED STATES PATENTS

| Number | Name | Date |
| --- | --- | --- |
| 2,233,447 | Dolman | Mar. 4, 1921 |
| 2,256,700 | Armstrong | Sept. 23, 1921 |
| 2,264,762 | Knight | Dec. 2, 1921 |
| 2,318,920 | Brown | May 11, 1943 |
| 2,349,814 | Deonier et al. | May 30, 1944 |
| 2,423,457 | Lynn | July 8, 1947 |
| 2,432,607 | Brown | Dec. 16, 1947 |
| 2,442,760 | Dieter | June 8, 1948 |

FOREIGN PATENTS

| Number | Country | Date |
| --- | --- | --- |
| 547,871 | Great Britain | Sept. 15, 1942 |

OTHER REFERENCES

War Dept. Tech. Bulletin #TB Med. 194—Aug. 17, 1945, page 31.